Sept. 2, 1941.                    C. G. JOA                    2,254,291
                           STACKING MECHANISM
                        Original Filed Oct. 30, 1937

INVENTOR
CURT G. JOA
BY
Wheeler, Wheeler & Wheeler
ATTORNEYS.

Patented Sept. 2, 1941

2,254,291

UNITED STATES PATENT OFFICE 2,254,291

STACKING MECHANISM

Curt G. Joa, Sheboygan Falls, Wis., assignor to Curt G. Joa, Inc., Sheboygan Falls, Wis., a corporation of Wisconsin Original application October 30, 1937, Serial No. 171,861. Divided and this application April 6, 1940, Serial No. 328,363

12 Claims. (Cl. 214—6)

This invention relates to improvements in stacking mechanisms. The present application is a division of my co-pending application entitled "Manufacture of sanitary napkins and the like," Serial No. 171,861, filed October 30, 1937.

It is the primary object of the present invention to provide an improved mechanism adapted to stack manufactured articles, whereby to greatly accelerate the output of an associated machine regardless of the specific type of article produced thereby.

Other objects will appear from the following disclosure and appended claims. I am aware of the fact that a number of changes may be made in the structure while still embodying the principle of the device as shown.

In the drawing.

Like parts are identified by the same reference characters throughout the several views.

Figure 1:
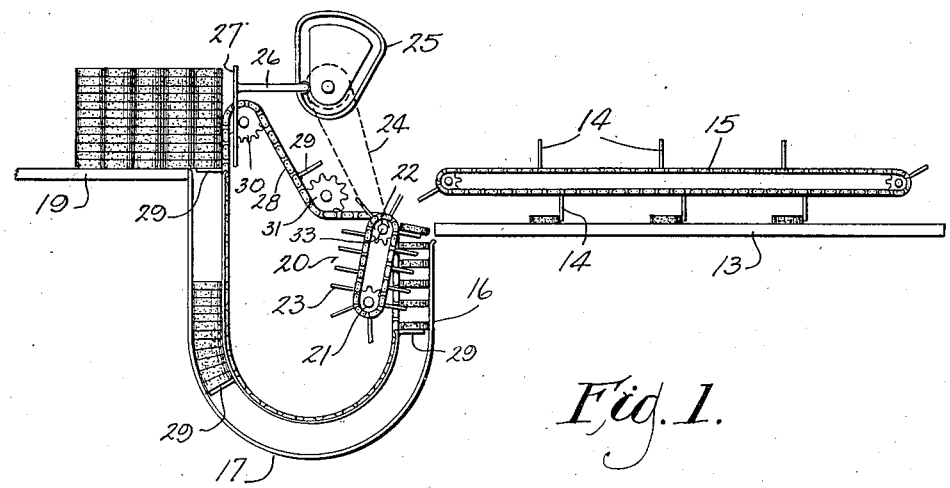
Fig. 1 is a detail view partially in end elevation and partly in transverse section, showing the stacking mechanism.

As disclosed in my above mentioned co-pending application, the manufacture of certain articles may be accelerated by employment of a plurality of assembly lines which are operated in unison to function concurrently on adjacent articles to deliver a plurality, preferably three, articles simultaneously at the end of a machine for discharge into a common stacker.

The principle of the article manufacturing machine being thus broadly stated, I shall now describe in detail the stacker mechanism shown in the drawing, which is illustrative of my inventive principle.

The completed articles are delivered from the assembly mechanism, not shown, over belt-type conveyors 10, 11 and 12, to a receiving table 13, into the path of successive lugs 14 mounted on conveyor chains 15 for movement across the table. Chains 15 move the pads successively into the mouth of a stacking hopper 16 which comprises a tube having a cross section similar to the outline of the completed article and extending curvilinearly about a bend at 17 to a packaging table 19. The hopper tube 16 ends flush with table 19.

One side of hopper 16 is open and in the opening operates a grouping conveyor 20 which comprises a pair of chains 18 operating over sets of sprockets 21 and 22, so located that the chains progressively recede from the path of the articles packed in the hopper. The chains carry aligned packing arms 23 and have means for driving them at such a rate that one article is received upon each pair of arms. As the chains move to propel the articles downwardly in the hopper 16, the arms are progressively withdrawn, as clearly appears in Fig. 1, until finally the articles are successively deposited upon each other in the hopper.

Figure 2:
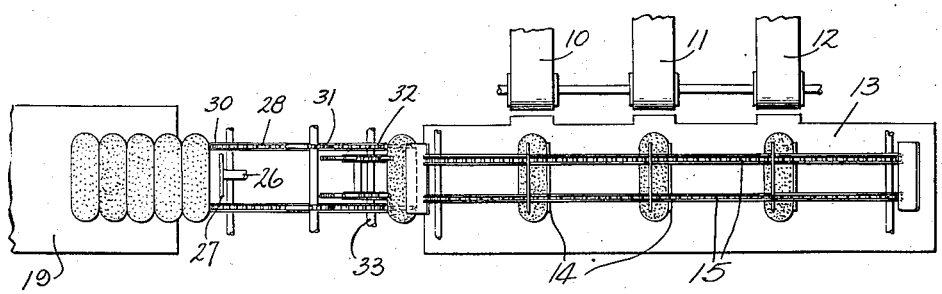
Fig. 2 is a plan view of the mechanism disclosed in Fig. 1.

Sprockets 22 of the grouping conveyor are keyed to a shaft 33 which also carries a pair of sprockets 32 over which a propelling conveyor operates as hereinafter disclosed. As best shown in Fig. 2, sprockets 32 are spaced outside sprockets 22 on shaft 33, and have a pair of conveyor chains 28 in mesh therewith. Chains 28 operate over additional sprockets 30 and 31 and carry spaced and oppositely positioned arms 29 in a continuous path clockwise of the mechanism, as viewed in Fig. 1, to provide a conveyor which is herein termed the projecting conveyor. Arms 29 move through elongated slots which are provided in housing 16 from the article receiving end to the ejecting end, and back to the receiving end to repeat the cycle.

The movement of arms 23 of grouping conveyor 20 are synchronized with the rate of article feed by conveyor arms 14, whereby one article is deposited on each successive arm 23. The articles are conveyed downwardly in spaced relation by the grouping conveyor until each arm recedes from the housing, at which point the article is deposited either directly upon a pair of projection conveyor arms 29 or upon another article which is supported thereby. The grouping conveyor deposits a stack of articles onto the arms 29 before a successive pair of like arms moves into the mouth of housing 16, whereupon another group is started.

As each pair of arms 29 moves downwardly toward the end of the housing, a point is reached at which gravity no longer propels the articles downwardly, and arms 29 move on to propel the previously deposited group upwardly and out of the housing. In this manner, the pair of conveyor arms which retard the movement of one stack of articles in their downward movement, leaves that group and pushes the successive group or stack upwardly to the discharge end of the tube. This cycle is repeated throughout the operation of the device.

The chain 24 drives from sprocket 22 a cam 25 which periodically engages a cam follower 26 to operate push plate 27 across the discharge end of the hopper housing, thereby thrusting onto table 19 all of the napkins which have already emerged from the housing. Ordinarily the timing will be such that the cam will function each time a predetermined number of articles have been ejected, thus moving successive stacks across the packing table, where they can readily be placed in boxes.

The stacker above described is particularly adapted for receiving the product of three separate assembly lines and delivering the product of said three assembly lines in a single line for packing. The rate of operation of conveyor 15 is so synchronized with reference to article delivery from the three assembly lines that the three articles ejected simultaneously from the three lines fall in front of three successive propelling paddles and then there is an interval in article delivery sufficient to permit the conveyor to move all of these articles to the stacker before the next set of three articles is ejected onto the table 13.

I claim:

1. In a device of the character described, a tubular housing provided with an axially extending slot means for delivering manufactured articles to the housing, means extending through the slot and into the housing for pushing said articles axially through said housing, and a ram reciprocable transversely of the housing, provided with actuating means for periodically ejecting laterally of said housing a stack containing a predetermined number of articles.

2. In an article assembly machine, the combination with a housing having a slotted wall, of a conveyor operating adjacent said housing and having arms extending through said wall into the housing, said conveyor being provided with guide means defining a conveyor path progressively divergent from said housing, whereby said arms are gradually withdrawn from the slotted wall thereof, means for delivering articles on to the successive arms of said conveyor to be placed in said housing and pushed therethrough, and an ejector adjacent the delivery end of said housing, and means for the timed operation thereof to push laterally a predetermined number of articles stacked in said housing.

3. In a device of the character described, a tubular housing provided with an axially extending slot article conveyor means for delivering articles thereto, means projecting through the slot and into the housing for pushing such articles through said housing, and a ram disposed for reciprocable transverse movement across the top of the housing and provided with actuating means for periodically ejecting laterally of said housing a stack comprising a predetermined number of articles.

4. A stacking mechanism, comprising a housing having a slotted wall, a conveyor operating adjacent said housing and having arms extending through said wall into the housing, said conveyer being disposed in oblique relation to said slotted housing wall whereby during operation of the device said arms are grdually withdrawn from the slotted wall thereof, and means for delivering articles on to the successive arms of the conveyor in a position to be directed by said arms into the mouth of said housing and means for contiguously grouping a predetermined number of articles, conveyor means for moving said group of articles through the housing, means for laterally transferring each group of articles to a table after said group has been transferred through the housing.

5. In a stacker mechanism, a slotted conduit provided with an arcuate portion, continuous conveyor mechanism provided with arms adapted to project into the slotted conduit and to move from one end of the conduit to the opposite end, then to repeat the cycle, a second conveyor mechanism disposed in oblique relation to one end of said conduit and provided with arms adapted for movement into the mouth of said conduit and thence toward the arcuate conduit portion, said arms being gradually withdrawn from the slotted conduit wall, conveyor means for delivering articles on to the successive arms of said second conveyor, whereby a predetermined number of articles are lowered into said housing intermediate successive arms of said first conveyor to be pushed through the housing by one of the arms, and an ejector adjacent the delivery end of said housing, and means for the timed operation thereof to push laterally each stack of articles when they are pushed clear of the delivery end of said housing by each successive arm of said first conveyor.

6. In a device of the character described, the combination with a guideway, of a grouping conveyor operating adjacent one end thereof and having arms extending into said guideway, said conveyor being disposed in oblique relation to said guideway to effect a gradual retraction of the arms therefrom, means for feeding articles into the path of said arms to be grouped and stacked by said conveyor, and a propelling conveyor operating along the path of the guideway in timed relation to the grouping conveyor, and having arms spaced to receive a plurality of articles carried by the arms of the grouping conveyor, said arms projecting into the guideway for movement therethrough, whereby to collect the articles into groups and to propel each group along said guideway.

7. Apparatus as set forth in claim 6 having means associated with the discharge end of said guideway and movable transversely thereof in synchronism with the propelling conveyor for the lateral ejection of each group of articles.

8. An article stacking mechanism including a horizontally disposed article feed platform and a horizontally disposed stacking platform spaced therefrom, a tubular conduit leading from a point adjacent one edge of the feed platform to a point adjacent one edge of the stacking platform, said conduit having a depending arcuate portion intermediate the platforms, means for feeding articles from the feed platform into the conduit, means for propelling groups of articles through the conduit, and means for delivering the groups of articles from the conduit onto the stacking platform.

9. In an article stacker, a generally U-shaped article transfer conduit disposed in a vertical plane with open ends upward, means for feeding and initially stacking articles in one end of the conduit, means for propelling stacks of articles through the conduit, and means for the removal of stacks of articles from the opposite end of the conduit.

10. A device of the character described comprising spaced feed and discharge platforms, a U-shaped conduit having leg portions terminating adjacent the respective platforms and a curvilinear portion therebetween, a first conveyor associated with the feed platform and arranged to propel individual articles over the feed platform to one of the legs of said conduit, a second conveyor comprising fingers arranged to receive successive articles from said feed platform and provided with guide means about which said second conveyor operates to lower successive articles into the associated leg of said conduit, a third conveyor movable along the conduit and comprising paddles spaced to receive a number of articles for propulsion through the conduit, said second conveyor guide means being so located as to define a path oblique respecting said conduit, whereby said fingers are progressively retracted from between successive articles, and a fourth conveyor comprising a ram adapted to discharge from successive paddles of said third conveyor stacks of articles onto said discharge platform, said ram being movable transversely across the leg of said conduit associated with the discharge platform.

11. A device of the character described, comprising the combination with a conduit having an admission end and a discharge end, of a conveyor including a pair of sprockets in immediate proximity to the admission end of said conduit and another pair of sprockets spaced from said conduit, a pair of conveyor chains operating over the first and second pairs of sprockets whereby to diverge obliquely from said conduit, fingers carried by the respective chains and adapted to receive articles delivered into the admission end of said conduit for advancing said articles into the conduit, said fingers being progressively retracted from between said articles in the oblique movement of said chains respecting said conduit, and means for delivering articles to said conduit and onto said fingers.

12. A device of the character described, comprising the combination with a conduit having an admission end and a discharge end, of a conveyor including a pair of sprockets in immediate proximity to the admission end of said conduit and another pair of sprockets spaced from said conduit, a pair of conveyor chains operating over the first and second pairs of sprockets whereby to diverge obliquely from said conduit, fingers carried by the respective chains and adapted to receive articles delivered into the admission end of said conduit for advancing said articles into the conduit, said fingers being progressively retracted from between said articles in the oblique movement of said chains respecting said conduit, a third set of sprockets proximate to the first mentioned sprockets, conveyor chains extending along said conduit and operating over the sprockets comprising the third set, and propelling means carried by said last mentioned chains and offset from said fingers and so spaced along the chains as to receive between them a plurality of articles advanced into said conduit by said fingers, whereby to propel said plurality of articles as a stack through said conduit.

CURT G. JOA.